United States Patent [19]
Fercher et al.

[11] Patent Number: 6,057,920
[45] Date of Patent: May 2, 2000

[54] OPTICAL COHERENCE TOMOGRAPHY WITH DYNAMIC COHERENT FOCUS

[75] Inventors: Adolf Friedrich Fercher, Vienna; Franz Lexer, Innsbruck; Harald Sattmann, St. Andrae-Woerdern, all of Austria

[73] Assignee: Carl Zeiss Jena GmbH, Jena, Germany

[21] Appl. No.: 09/281,392

[22] Filed: Mar. 30, 1999

[30] Foreign Application Priority Data

Mar. 30, 1998 [DE] Germany ............... 198 14 070

[51] Int. Cl.[7] ............................................. G01B 9/02
[52] U.S. Cl. ............................................. 356/357
[58] Field of Search ........................ 356/345, 351, 356/357, 358

[56] References Cited

U.S. PATENT DOCUMENTS 5,321,501  6/1994  Swanson et al. ............... 356/345
5,847,827  12/1998  Fercher ............... 356/345
5,877,856  3/1999  Fercher ............... 356/351

OTHER PUBLICATIONS

Absolute optical ranging using low coherence interferometry, danielson et al, Applied Optics, Jul. 1991, pp. 2975–2979.

Primary Examiner—Samuel A. Turner
Attorney, Agent, or Firm—McAuley Nissen Goldberg Kiel & Hand, LLP

[57] ABSTRACT

In coherence tomography, an interferometric measurement light beam scans the measurement object and is focused for improving the transverse resolution. In order to achieve a high transverse resolution over the entire object depth, the focal displacement and the change in path length in the measurement light beam for maintaining the coherence of the focus is achieved by one and the same moving optical element in the measurement light beam. The present invention achieves this by a particularly simple and easily adjustable arrangement which is characterized by especially low light loss in the measurement beam path.

7 Claims, 3 Drawing Sheets

OPTICAL COHERENCE TOMOGRAPHY WITH DYNAMIC COHERENT FOCUS

BACKGROUND OF THE INVENTION a) Field of the Invention

This invention relates to the technical field of optical image acquisition.

This invention is directed to a method for coherence tomography with increased transverse resolution based on registering the position of locations diffusely reflecting light along a measurement light beam of a short coherence interferometer, which measurement light beam scans the object and penetrates into the object, wherein the respective position of the locations which diffusely reflect light along the measurement light beam in the object is determined as the path length required in the reference arm for achieving interference with a reference light beam, wherein the measurement light beam is focused for optimizing the transverse resolution in the respective location in the object diffusely reflecting light and this focus remains coherent relative to the reference light during its movement along the measurement path, wherein the required movement of this focus and the path length balancing which is required to ensure its coherence relative to the reference light are brought about by the movement of an individual optical structural component part.

b) Description of the Related Art

In optical coherence tomography (Huang, D.; Swanson, E. A; Lin, C. P.; Schuman, J. S.; Stinson, W. G.; Chang, W.; Hee, M. R.; Flotte, T.; Gregory, K; Puliafito, C. A; Fujimoto, J. G., Optical Coherence Tomography, Science 254 (1991), pages 1178–1181), two-dimensional sectional images of objects are obtained in that the objects are scanned along a line by a light beam. This line gives the transverse dimension of the tomographic image or tomogram. In every position along this line, the radiation also penetrates into the depth of the object. The depth position of points which diffusely reflect light is measured by means of a short coherence interferometer and gives the longitudinal dimension of the tomographic image. The strength of the diffuse reflectance of light from these points determines the brightness in the image points of the tomogram.

In short coherence interferometry, light of low temporal coherence but high spatial coherence is used. The depth position of points diffusely reflecting light is given from the length of the reference beam of the short coherence interferometer. The length of the reference beam is continuously changed; the interference occurring at the interferometer output belongs to object points in the measurement light beam for which there is equality of lengths of the reference beam and measurement light beam calculated up to the object point in question. The known length of the reference beam is then—within the coherence length of the utilized light—equal to the sought for measurement light beam length to the point in the measurement object which diffusely reflects light. This method is known as a "coherence scan".

During the coherence scan, either the measurement object is located in the measurement arm of a two-beam interferometer and the measurement light beam lengths are determined from the optical length of the reference arm of the interferometer (Swanson, E. A.; Huang, D.; Hee, M. R.; Fujimoto, J. G.; Lin, C. P.; Puliafito, C. A.; High-speed optical coherence domain reflectometry, Opt Lett 17 (1992), pages 151–153) or the measurement object is illuminated by a dual beam (see Fercher, A. F.; Li, H. C.; Hitzenberger, C. K.; Slit Lamp Laser Doppler Interferometer, Lasers Surg. Med. 13 (1993), pages 447–542) which exits from a two-beam interferometer and the measurement beam lengths are determined by adapting the path differences in said two-beam interferometer to the optical distances between object points in the measurement object which reflect light diffusely.

Both methods have in common that the longitudinal depth information is obtained by means of a method of short coherence interferometry, but the transverse information is obtained through the scanning process with the measurement light beam. In this respect, a very high optical resolution (=shortest distance between two points which are still separately detectable) is achieved by means of short coherence interferometry in the longitudinal direction, that is, in the direction of the illuminating light beam. This is approximately the magnitude of the coherence length $I_c = \lambda^2/\Delta\lambda$ ($\lambda$=wavelength, $\Delta\lambda$=bandwidth of the utilized light), that is, the magnitude of several $\mu$m. However, a similarly good optical resolution is achieved transverse to the illumination direction only in exceptional cases; in particular, the transverse optical resolution is not uniformly good over the entire object depth. A high and uniformly good resolution over the entire object depth is achieved by using a dynamic coherent focus, as it is called. By dynamic coherent focus is meant the focus of a light bundle which always remains coherent relative to the reference light even with spatial displacement. There are already proposed realizations of a dynamic coherent focus. The method according to the invention will be explained more fully hereinafter with reference to the Figures.

Focused light bundles have already been used for a long time for precise determination of position and object positioning. However, this still relates to the determination of the position of object surfaces and not to the determination of the depth structure of the objects. For example, the German Offenlegungsschrift DE 2 333 281 (date of publication: Jan. 17, 1974) describes a method for adjusting the focal point of an optical system based on interferometry (but not short coherence interferometry). In this case, the measurement light beam is focused on the object surface and the reflected light is interfered with a reference light beam. The shape of the interference fringes then forms a criterion as to whether or not the object surface is located in the focus. This method is therefore suitable only for determining the position of individual object surfaces and therefore does not represent a direct alternative to the method according to the invention. Further, when depth structure is present, there occur statistical interference phenomena, so-called speckle, which largely defy interpretation. Another method for determining the position of object surfaces is described in U.S. Pat. No. 4,589,773 (patent date: May 20, 1986). In this case, the object surface is obliquely illuminated by a measurement light bundle as in the known optical light section microscope. A longitudinal displacement of the object accordingly results in a transverse displacement of the light spot on the object surface. This light spot is imaged on a special photodetector which converts the amount of deviation of the light spot from the reference position into an electrical signal and thus allows the position of the object to be determined. This method is also suitable only for determining the position of individual surfaces, but not for recording the depth structure of an object. It does not work by interferometry and, therefore, also has no interferometric sensitivity and can therefore not be compared with the method according to the invention.

Further methods for determining the position of individual object surfaces are known in the context of the problem of focusing in compact discs; for example, U.S. Pat. No. 4,631,395 (patent date: Dec. 23, 1986) and U.S. Pat. No. 4,866,262 (patent date: Sep. 12, 1989). These methods are also only suitable for determining the position of individual surfaces but not for recording the depth structure of an object; they do not work by interferometry and therefore cannot be compared with the method according to the invention.

On the other hand, the problem of transverse resolution in coherence biometry and coherence tomography is addressed in the international PCT application WO 92/19930 "Method and Apparatus for Optical Imaging and Measurement" (priority date: Apr. 29, 1991; inventors: Huang, D.; Fujimoto, J. G.; Puliafito, C. A.; Lin, C. P.; Schuman, J. S.). In this patent, the above-mentioned problem of a high and uniformly good transverse resolution over the entire object depth is achieved in that the deflecting mirror is moved synchronously in the reference beam path simultaneous with the movement of the measurement focus.

While a synchronous movement of the measurement focus and deflecting mirror in the reference beam can be carried out technically, it represents considerable additional mechanical and electronic expenditure. Further, the geometric displacement of the measurement focus will generally not correspond to the change in the optical length in the reference beam because there are different indexes of refraction in the measurement light beam path and in the reference beam path. Therefore, the suggestion is found in scientific literature that the focal displacement and the balancing of the optical lengths between the measurement light beam and reference beam are carried out by means of the displacement of an individual optical element; see, for example, Fercher, A. F., Optical Coherence Tomography, J. Biomed. Opt. 1 (1996), no. 2, pages 157–173.

This and the method according to the invention will be described with reference to the following Figures.

BRIEF DESCRIPTION OF THE DRAWINGS

In the drawings:

The following reference numbers are used in the figures:
1 light source with large spatial coherence, but small temporal coherence
2 light beam with large spatial coherence, but small temporal coherence
3 beam splitter
4 measurement light beam
5 reference beam
6 reference mirror
7 beam splitter
9 focusing optics
10 convex mirror
11 focus of convex mirror
12 focusing optics
13 scanning mirror
13' axis of rotation of the mirror 13
14 scanning mirror
14' axis of rotation of mirror 14
15 measurement object of which a tomogram is produced
16 dynamic coherent focus
17 measurement light beam
18 optics
19 photodetector
20 movement direction of mirror 10 during coherence scan
21 movement direction of the reference mirror 6 for adjusting the coherence between the measurement light beam and the reference beam
30 temporally short coherent, spatially highly coherent light source
31 fiber output of light source 30
32 temporally short coherence, spatially highly coherent light bundle
33 collimating optics
34 beam splitter
35 mirror
36, 36' measurement light beam
37 reference light bundle
38 deflecting roof prism
39 optics
40 measurement light beam focus
40' dynamic focus
40" dynamic focus
41 mirror
42 alternative movement for mirror 41
43 axis of rotation of mirror 41
43' drive motor for mirror 41
44 collimating optics
45 deflecting mirror for controlling the measurement light beam 36' in the x-direction
45' axis of rotation of deflecting mirror 45
46 deflecting mirror for controlling the measurement light beam 36' in the y-direction
46' axis of rotation of deflecting mirror 46
47 focusing optics
48 imaging optics
49 measurement object
50 dynamic coherent focus
51 light bundle diffusely reflected by an object point
52 optics
53 photodetector
60 focus position without light refraction
61 polygon mirror FIG. 1 shows an arrangement described in scientific literature for coherence distance measurement with dynamic coherent focus. In this case, the light source 1 emits a light beam 2 with short coherence length which impinges on the beam splitter 3, wherein the beam is divided into measurement light beam 4 and reference beam 5 at the splitter surface of the beam splitter 3. The reference beam 5 is reflected from the reference mirror 6, via the beam splitter 3, to the photodetector 19 at the interferometer output. The component of the light beam 2 that has just penetrated the beam splitter 3 travels as measurement light beam 4 to the beam splitter 7 and is focused by the optics 9 in focus 11. The focus 11 lies in the center of curvature of the convex mirror 10 functioning as reflector. The measurement light beam 4 reflected at the convex mirror 10 is collimated again by the optics 9 and impinges on the optics 12 which focus it anew. The measurement light beam 4 is finally focused on the measurement object 15 in the dynamic coherent focus 16 via scanning mirrors 13 and 14. The scanning mirrors 13 and 14 are rotatable about axes of rotation 13' and 14' so that the measurement light beam 4 can be controlled in any desired x- and y-coordinates in the measurement object 15.

Figure 1:
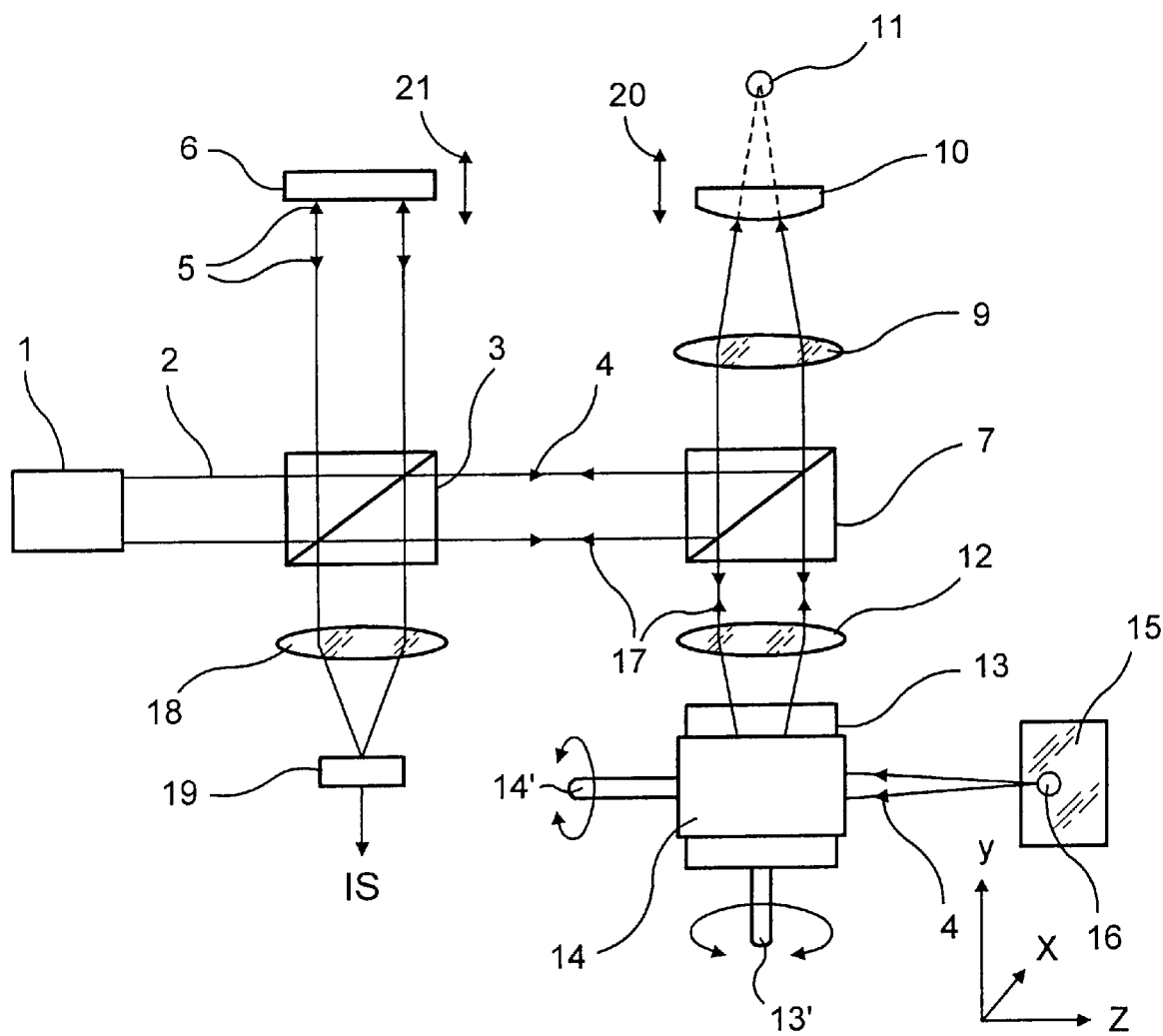
FIG. 1 illustrates coherence tomography with dynamic coherent focus corresponding to the known prior art.

The measurement light beam 17 diffusely reflected by the measurement object 15 travels back to the convex mirror 10, is reflected at the latter again and directed by the beam splitters 7 and 3 via the optics 18 to the photodetector 19. At the latter, the measurement light beam 17 interferes with the reference beam 5 which is reflected from the reference mirror 6 and generates an electronic interferometer signal IS at the photodetector 19 which is proportional to the resulting light intensity.

The coherence scan is achieved in this arrangement by the movement of the reflector 10. This is indicated by the double arrow 20. This results in a movement of focus 11 and accordingly also a movement of focus 16 in the z-direction in the measurement object. Through the displacement of the deflecting mirror 6 in the direction of the axis of the reference beam 5 indicated by the double arrow 21, coherence is adjusted between the light diffusely reflected from the focus 16 and the reference beam 5 at the interferometer output (photodetector 19). While the coherence scan is being carried out, the focus 16 is moved in the z-direction through the measurement object 15. As a result of the change in the optical path length carried out simultaneously with the focus movement, the coherence of the light diffusely reflected from this focus with the reference light is maintained (hence the designation "dynamic coherent focus").

It is also noted that the known state of the art of polarization optics is used for reducing reflection losses at the surfaces of the structural component parts and for optimizing the beam splitters of the interferometers described herein. However, since this is part of the known state of the art of general optical interferometer technique, it will not be described in more detail.

The short coherence interferometer shown in FIG. 1 is very difficult to adjust and suffers from problems which are difficult to overcome and which are brought about by so-called parasitic, that is, unwanted, reflections. The reason for this is that some optical structural component parts such as the beam splitter 7 and optics 9 must be traversed as many as four times by the measurement light beam. This is due to the fact that the light bundle 4 forming the focus is already reflected once on the way to the object 15. The occurring light reflections can then be associated with the surfaces generating them only with great difficulty during adjustment of the beam path, so that the adjustment of the apparatus is made much more difficult; moreover, these light reflections worsen the signal-to-noise ratio of the device.

OBJECT AND SUMMARY OF THE INVENTION

Therefore, it is the primary object of the invention to find an optical coherence tomography method with dynamic coherent focus that is easy to adjust in which the measurement light beam takes an easily detectable and accordingly easily adjustable optical course, the parasitic reflections occurring at the structural component parts are easier to prevent and fewer reflection losses in the measurement beam path lead to an improvement in the signal-to-noise ratio.

This object is met in that the measurement light beam (36 in FIG. 2) is initially focused close to a moving plane mirror (41 in FIG. 2) and is reflected in the direction of the measurement object at this plane mirror at an angle ($\alpha$ in FIG. 2) that is less than $\pi$, and the measurement light beam focus (40 in FIG. 2) is imaged in the object via the moving plane mirror and additional optics.

DESCRIPTION OF THE PREFERRED EMBODIMENTS

Figure 2:
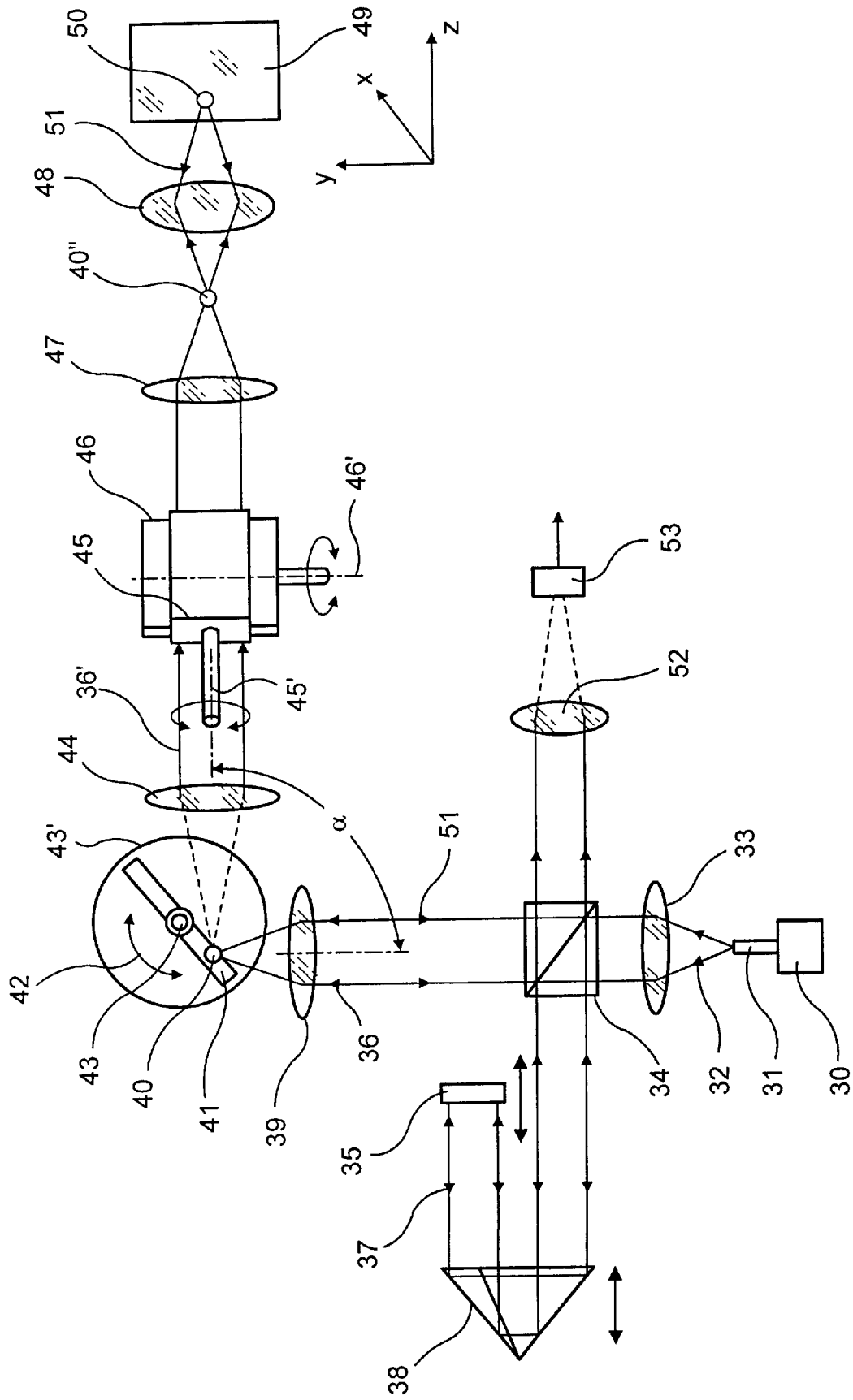
FIG. 2 illustrates in schematic form coherence tomography method according to the invention with dynamic coherent focus.

A realization of the method according to the invention is described with reference to FIG. 2. In FIG. 2, a partially coherent light source, for example, a superluminescent diode 30 with an optical fiber output 31 emits a temporally short coherent, but spatially highly coherent light bundle 32. This light bundle is collimated by optics 33 and impinges on the beam splitter 34. A portion of the light bundle is passed by the beam splitter 34 and forms the measurement light beam 36. Another portion of the light bundle is reflected by the beam splitter 34 and forms the reference light bundle 37. The latter is directed by the deflecting roof prism 38 to the mirror 35 and is reflected back by the latter.

Figure 3:
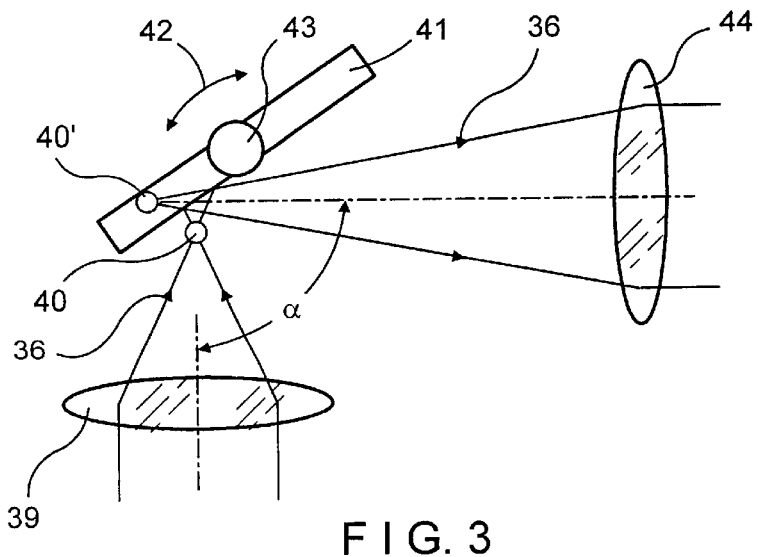
FIG. 3 illustrates in diagrammatic form the formation of dynamic focus image.

The measurement light beam 36 is focused by optics 39 in focus 40 close to the moving plane mirror 41 as is shown in FIG. 3. The mirror 41 is coated on the side facing the optics 39. This mirror is moved by means of a swinging movement (indicated by the double arrow 42) or, alternatively, by a rotating movement of the mirror 41 about its axis of rotation 43. When the focus 40 is situated in front of this mirror surface, its virtual image 40' moves. If the focus 40 is situated behind the mirror surface of the plane mirror, there results a virtual focus which is likewise moved by the movement of the plane mirror 41. In both cases, there results a movable or dynamic focus (40') which is imaged in the object 49 by the subsequent optics (for example, optics 44, 47 and 48 in FIG. 2).

The measurement light beam 36' proceeding from the dynamic focus 40' is approximately collimated by optics 44 and reflected further in the direction of the object by two rotatable (indicated by double arrows) deflecting mirrors 45 and 46 with axes of rotation 45' and 46'. The optics 47 focuses the measurement light beam 36' in focus 40'' which is finally imaged by optics 48 in the measurement object 49 as dynamic coherent focus 50.

The light bundle 51 which is diffusely reflected from the dynamic coherent focus 50 travels back over the optics 48, 47, 44 and 39 and mirrors 46, 45 and 41 and is directed from the beam splitter 34 and optics 52 to the photodetector 53 where it interferes with the reference light bundle 37. In order for this interference to occur, the optical reference light path length must be equal to the optical length in the measurement light beam path. This can be carried out by means of displacing the deflecting roof prism 38 and/or by displacing the mirror 35 as is indicated by the double arrows. For this purpose, the deflecting roof prism 38 and mirror 35 are mounted, for example, on a linear scanning stage which is displaceable in a controlled manner by a stepper motor. Thus, the required length balancing between the reference light path length and the measurement light path length can be carried out quickly. Once this path balancing has been carried out, the deflecting prism 38 and the mirror 35 remain immobile during the coherence scan. This is an essential characteristic of the method according to the invention. Another essential characteristic of the method according to the invention is given in relation to the arrangement shown in FIG. 1 in that no need in this case for an optics component which is traversed 4 times by the measurement beam.

The displacement of the dynamic focus 40' is compensated by the respective change in the optical path. For this purpose, it is assumed on the one hand that the dynamic focus 40' is imaged in the object in a 1:1 imaging scale and on the other hand that the light bundle penetrating into the object is not interrupted and the index of refraction of the object is equal to one.

Figure 4:
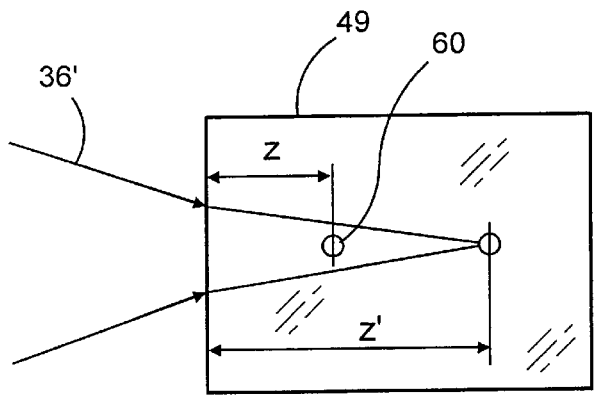
FIG. 4 illustrates in diagrammatic form the focus displacement in the object brought about by the optical density of the object and the refraction of light at the object surface.

Above all, however, the latter is not the case in general. Moreover, light refraction also generally occurs at the entrance point of the measurement light beam 36' into the object 49. As a result of the light refraction, a focus 60 lying at an object depth Z without refraction actually occurs at a depth Z'. This is shown in FIG. 4. According to the laws of geometric optics, with small apertures of the light bundle 36' focussed in focus 50 Z'=n·Z in a first approximation, with large apertures Z'=n²·Z, where n is the phase refractive index of the object. In the case of medium apertures of the light bundle focused in focus 50, Z' lies between n·Z and n²·Z.

Further, since in short coherence interferometry the optical path length in the object is equal to the geometric path length times the group index N of the object, a focal shift by distance Z will actually lead to an optical displacement of Z'=n·N·Z with small apertures and to an optical displacement of Z'=n²·N·Z with large apertures of the light bundle. Therefore, in order to maintain the coherence of focus 50, the geometric-optical magnification in the imaging of the dynamic focal image 40' in the object must be carried out by means of optics 44, 47 and 48 with a longitudinal scale of 1:1/(n·N) with small apertures of the light bundle focused in focus 50 or with a longitudinal scale of 1:1/(n²·N) with large apertures of the light bundle focussed in focus 50. With medium apertures of the light bundle focused in focus 50, a longitudinal scale between the values of 1:1/(n·N) and 1:1/(n²·N) is to be used.

Figure 5:
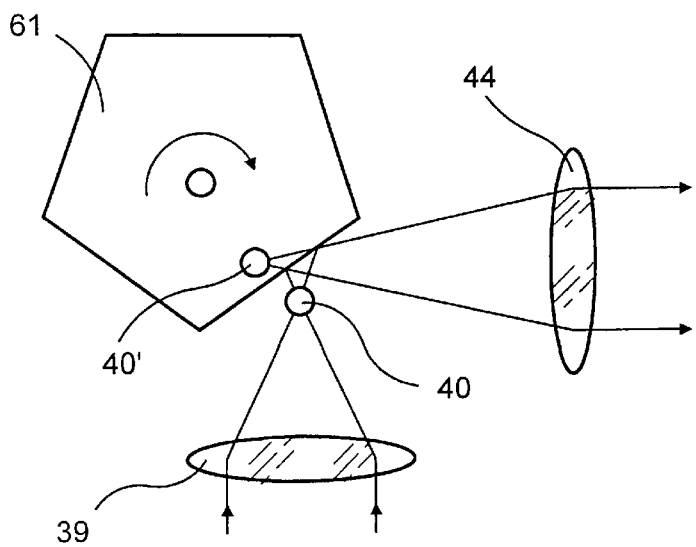
FIG. 5 illustrates in diagrammatic form the production of a dynamic focus image by reflection of a real focus at a rotating polygon mirror.

The plane mirror 41 used for producing a dynamic focal image 40' can swivel or rotate. In another embodiment form according to the invention, a rotating polygon mirror 61 is used instead of the plane mirror 41. This is shown in FIG. 5. The rotating polygon mirror—in this case a polygon mirror with 5 plane mirrors—has the advantage that it can rotate very fast so that a very fast tomography process can be realized.

While the foregoing description and drawings represent the preferred embodiments of the present invention, it will be obvious to those skilled in the art that various changes and modifications may be made therein without departing from the true spirit and scope of the present invention.

What is claimed is:

1. A method for coherence tomography with increased transverse resolution comprising the steps of:

registering the position of locations diffusely reflecting light along a measurement light beam of a short coherence interferometer, which measurement light beam scans the object and penetrates into the object;

determining the respective position of the locations which diffusely reflect light along the measurement light beam in the object as the path length required in the reference arm for achieving interference with a reference light beam;

focusing the measurement light beam for optimizing the transverse resolution in the respective location in the object diffusely reflecting light and wherein this focus remains coherent relative to the reference light during its movement along the measurement path;

bringing about the required movement of this focus and the path length balancing which is required to ensure its coherence relative to the reference light by the movement of an individual optical structural component part;

initially focusing measurement light beam close to a moving plane mirror and which is reflected in the direction of the measurement object at this plane mirror at an angle that is less than π; and imaging the measurement light beam focus in the object via the moving plane mirror and additional optics.

2. An arrangement for coherence interferometry and tomography with increased transverse resolution by a method comprising the steps of:

registering the position of locations diffusely reflecting light along a measurement light beam of a short coherence interferometer, which measurement light beam scans the object and penetrates into the object;

determining the respective position of the locations which diffusely reflect light along the measurement light beam in the object as the path length required in the reference arm for achieving interference with a reference light beam;

focusing the measurement light beam for optimizing the transverse resolution in the respective location in the object diffusely reflecting light and wherein this focus remains coherent relative to the reference light during its movement along the measurement path;

bringing about the required movement of this focus and the path length balancing which is required to ensure its coherence relative to the reference light by the movement of an individual optical structural component part;

initially focusing measurement light beam close to a moving plane mirror and which is reflected in the direction of the measurement object at this plane mirror at an angle that is less than π; and imaging the measurement light beam focus in the object via the moving plane mirror and additional optics, said arrangement comprising that a real focus reflected by a moving plane mirror is imaged in the measurement object in the measurement light beam of a Michelson interferometer in an imaging scale of 1:1.

3. An arrangement for coherence interferometry and tomography with increased transverse resolution by a method comprising the steps of:

registering the position of locations diffusely reflecting light along a measurement light beam of a short coherence interferometer, which measurement light beam scans the object and penetrates into the object;

determining the respective position of the locations which diffusely reflect light along the measurement light beam in the object as the path length required in the reference arm for achieving interference with a reference light beam;

focusing the measurement light beam for optimizing the transverse resolution in the respective location in the object diffusely reflecting light and wherein this focus remains coherent relative to the reference light during its movement along the measurement path;

bringing about the required movement of this focus and the path length balancing which is required to ensure its coherence relative to the reference light by the movement of an individual optical structural component part;

initially focusing measurement light beam close to a moving plane mirror and which is reflected in the direction of the measurement object at this plane mirror at an angle that is less than π; and imaging the measurement light beam focus in the object via the moving plane mirror and additional optics, said arrangement comprising that a real focus reflected by a moving plane mirror is imaged in the measurement light beam of a Michelson interferometer in a longitudinal imaging scale other than 1:1.

4. The arrangement for coherence interferometry and tomography with increased transverse resolution according to claim 2, comprising that the dynamic focus is generated by reflection at a swiveling plane mirror.

5. The arrangement for coherence interferometry and tomography with increased transverse resolution according to claim 3, comprising that the dynamic focus is generated by reflection of a swiveling plane mirror.

6. The arrangement for coherence biometry and tomography with increased transverse resolution according to claim 2, comprising that the dynamic focus is generated by reflection at a rotating plane mirror.

7. The arrangement for coherence biometry and tomography with increased transverse resolution according to claim 3, comprising that the dynamic focus is generated by reflection at a rotating plane mirror.

* * * * *